July 8, 1930.　　　W. E. KROTEE　　　1,769,957
GEARING
Filed April 28, 1928　　　3 Sheets-Sheet 1
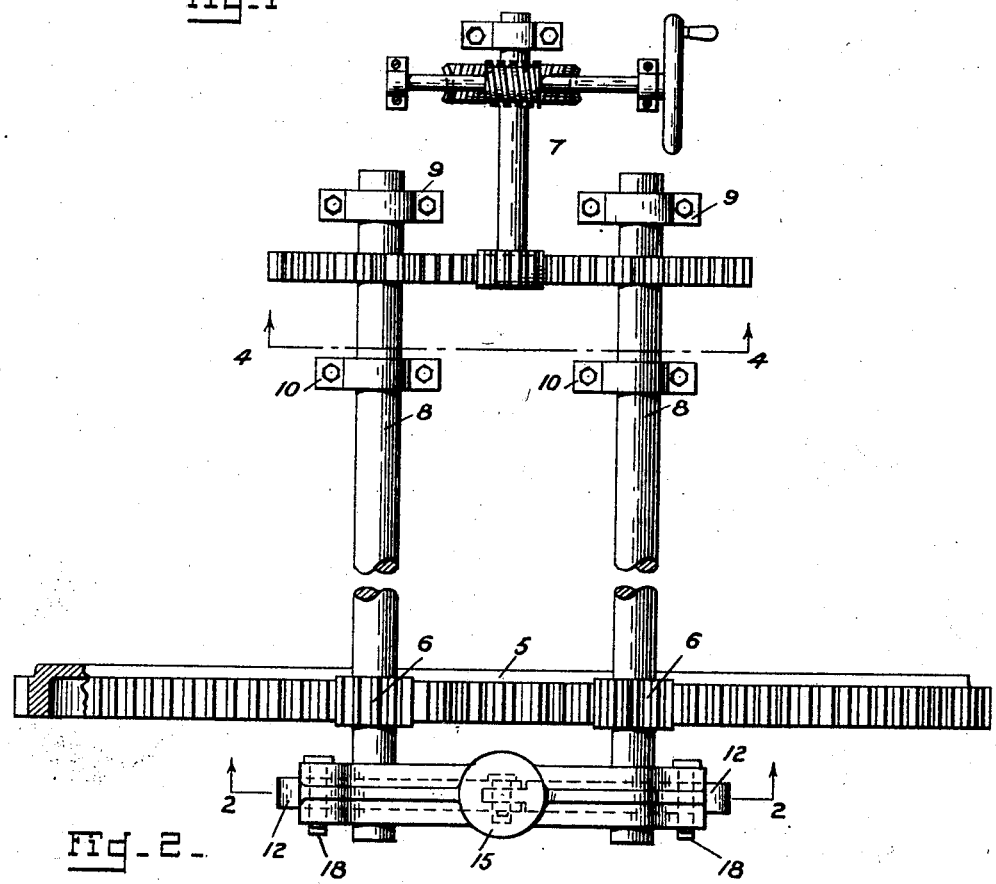
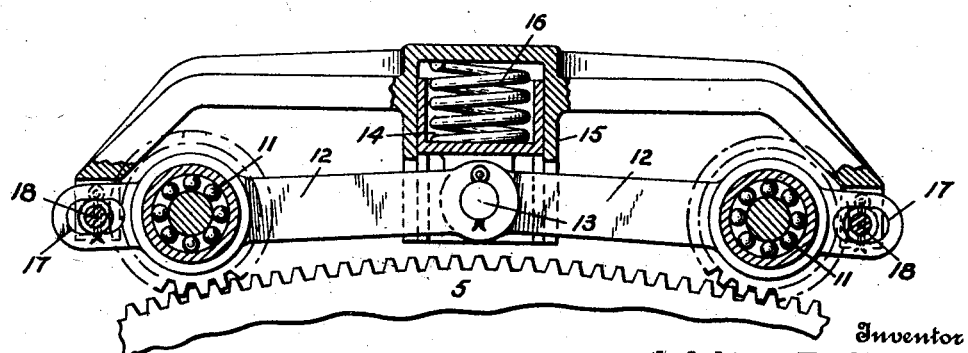
Inventor
Walter E. Krotee
By W. N. Roach
Attorney July 8, 1930. W. E. KROTEE 1,769,957
GEARING
Filed April 28, 1928 3 Sheets-Sheet 2
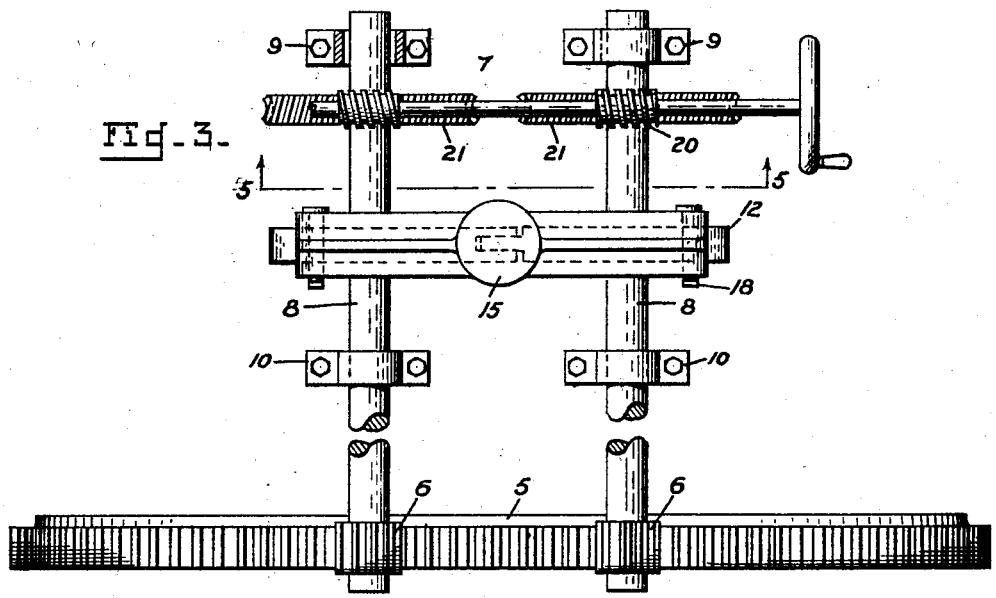
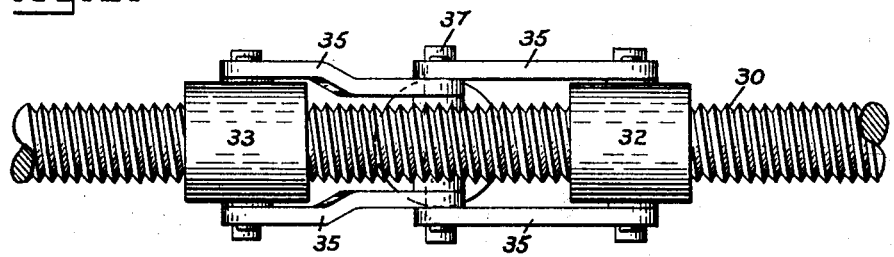
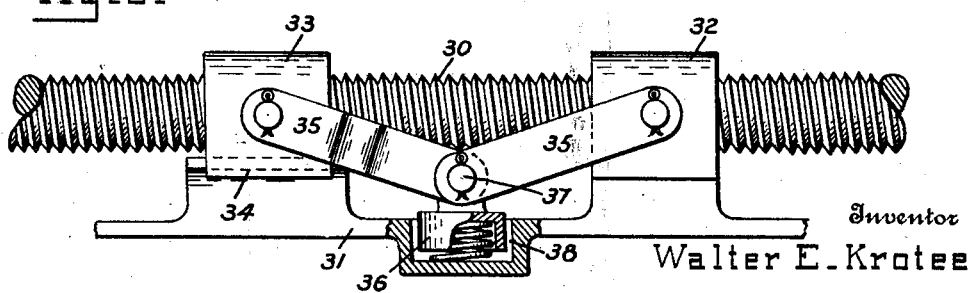
Inventor
Walter E. Krotee
By W. N. Roach
Attorney

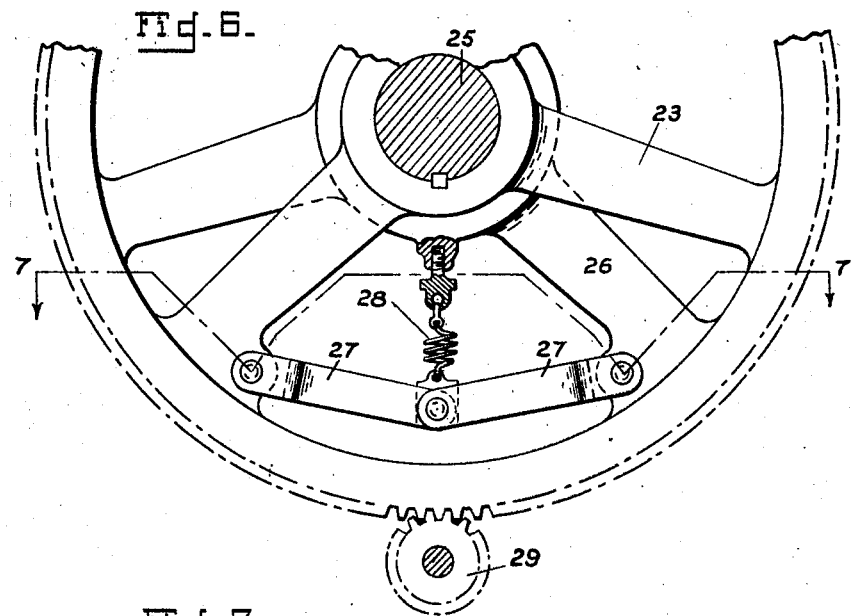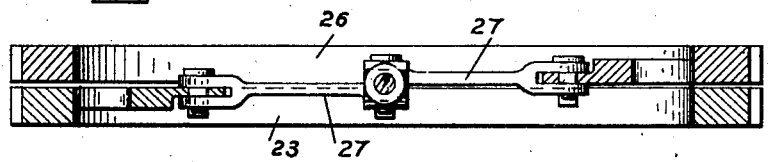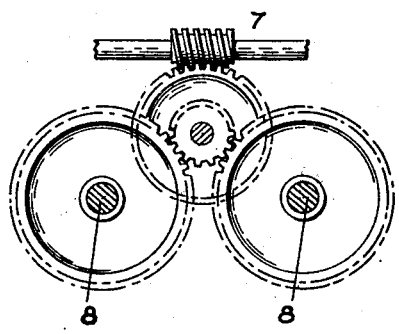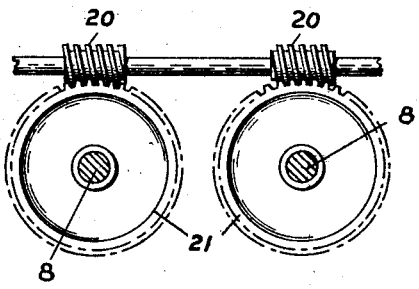
Inventor
Walter E. Krotee
By W. N. Roach.
Attorney Patented July 8, 1930

1,769,957

UNITED STATES PATENT OFFICE

WALTER E. KROTEE, OF PHILADELPHIA, PENNSYLVANIA

GEARING

Application filed April 28, 1928. Serial No. 273,697.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to gearing and more particularly it has reference to means for taking up the clearance between the gear teeth in a system of gearing.

The invention is directed to an arrangement wherein either the driving or driven element of the gearing is duplicated and the duplicated element is under control of a toggle mechanism.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

Several practical embodiments of the invention are illustrated in the accompanying drawings, wherein:

Fig. 1 is a more or less diagrammatic plan view partly in section, showing a system of gearing including the preferred embodiment of the invention;

Fig. 2 is a detail sectional view taken on the line 2—2 of Fig. 1;

Fig. 3 is a view similar to Fig. 1 with the toggle mechanism in a different position;

Fig. 4 is a sectional view taken on the line 4—4 of Fig. 1;

Fig. 5 is a view in elevation of an alternate means for driving the pinion shafts of Fig. 1 and taken on the line 5—5 of Fig. 3;

Fig. 6 is a fragmentary view in side elevation showing the application of the invention to a split gear;

Fig. 7 is a detail sectional view on the line 7—7 of Fig. 6;

Figs. 8 and 9 are views, respectively, in plan and side elevation illustrating the application of the invention to a translating screw mechanism.

Referring to the drawings by numerals of reference:

The gear system shown in Figs. 1 and 2 comprises generally a driven gear 5, duplicate driving pinions 6 and actuating mechanism 7 for imparting rotation to the parallel pinion shafts 8. Each of the shafts 8 is mounted in bearings 9 and 10.

The outer end of each of the shafts is mounted through a bearing 11 in the extremity of links 12 which are connected centrally by a pin 13 to provide a toggle mechanism disposed in the plane of the driven gear 5. The pin 13 is on a hollow crosshead 14 fitting in a cylindrical bearing 15 in the bracket and confining a helical spring 16. The outer ends of the links 12 are each formed with a slot 17 for mounting on a pin 18 in the bracket.

In Fig. 6 the principles of the invention are illustrated in its application to a split gear. The split gear is made in two parts one part 23 keyed as at 24 to the shaft 25 and the other part 26 journaled on the shaft. One of the toggle links 27 is pivoted to the fixed gear 23 and the other to the free gear 26. A spring 28 adjustably connected to one of the gears may supply the pressure medium for actuating the toggle to displace the free gear and take up the clearance between the gear and pinion 29.

In Fig. 8 the invention is applied to a gear in which the screw 30 is to move the carriage 31. The gearing on the carriage consists of a fixed butt 32 and a displaceable nut 33 which is keyed to the carriage as at 34 to restrain it against rotation. The links 35 of the toggle are connected to each of the nuts and because one of these nuts is fixed the crosshead 36 on the joint 37 of the toggle must be arranged for lateral displacement as indicated by the clearance at 38.

The operation of the modified forms of the invention in their different applications is the same as that described in connection with Figs. 1 and 2.

The action of the spring 16 in tending to straighten out the toggle joint imparts a lateral displacement to the pinion shafts, preferably through flexure of the shafts, which is converted into a rotary movement of the shafts by virtue of the pinions which are thus caused to revolve about the periphery of the gear 5. Rotation of the pinions will be discontinued when all clearance is taken up between the teeth in the actuating mechanism and, as will be apparent from Fig. 2, there will also be no clearance between the teeth of the pinion and the gear. Furthermore, the duplication of the pinions and the consequent duplication of the actuating mechanism will insure a positive engagement of these parts irrespective of the direction in which the gearing 5 is to be rotated and there will be no lost motion in accomplishing the transition.

The arrangement shown in Fig. 3 is similar to that shown in Fig. 1 except that the toggle mechanism is positioned adjacent the actuating mechanism 7 and the bearings are arranged to allow for lateral movement of the pinion shafts. The actuating mechanism in this instance consists of a worm 20 and worm wheel 21.

In Fig. 4 an alternate form of actuating mechanism is shown in which the pinion is off center. The toggle mechanism associated in the manner of Fig. 3 with this type of actuating mechanism would be made to draw the pinion shafts 8 together instead of spreading them.

I claim:

1. In a gear system, a driven gear, spaced pinions meshing with said gear, shafts on which the pinions are carried, actuating mechanism for said pinion shafts, a toggle mechanism having its links connected to the pinion shafts, and means for actuating the toggle to impart a bodily displacement to the pinion shafts.

2. In a gear system, a driven gear, spaced pinions meshing with said gear, parallel shafts on which the pinions are carried, actuating mechanism for said pinion shafts and means tending to move the shafts out of parallelism.

3. In a gear system, a driven gear, spaced pinions meshing with said gear, shafts on which the pinions are carried, actuating mechanism for said pinion shafts and means tending to impart bodily displacement to a shaft or shafts.

WALTER E. KROTEE.